(12) United States Patent
Kaneta

(10) Patent No.: US 10,738,713 B2
(45) Date of Patent: Aug. 11, 2020

(54) THROTTLE VALVE ABNORMALITY DETERMINATION DEVICE

(71) Applicant: HINO MOTORS, LTD., Hino-shi, Tokyo (JP)

(72) Inventor: Motoyoshi Kaneta, Hino (JP)

(73) Assignee: HINO MOTORS, LTD., Hino-shi, Tokyo (JP)

( * ) Notice: Subject to any disclaimer, the term of this patent is extended or adjusted under 35 U.S.C. 154(b) by 218 days.

(21) Appl. No.: 16/077,009

(22) PCT Filed: Feb. 9, 2017

(86) PCT No.: PCT/JP2017/004711
§ 371 (c)(1),
(2) Date: Aug. 9, 2018

(87) PCT Pub. No.: WO2017/138602
PCT Pub. Date: Aug. 17, 2017

(65) Prior Publication Data
US 2019/0032578 A1 Jan. 31, 2019

(30) Foreign Application Priority Data
Feb. 12, 2016 (JP) ................... 2016-024531

(51) Int. Cl.
*F02D 9/02* (2006.01)
*F02B 29/04* (2006.01)
(Continued)

(52) U.S. Cl.
CPC ............... *F02D 9/02* (2013.01); *F02B 29/04* (2013.01); *F02D 11/10* (2013.01); *F02D 45/00* (2013.01);
(Continued)

(58) Field of Classification Search
CPC . F02D 9/02; F02D 45/00; F02D 11/10; F02D 2011/108; F02D 2009/0281;
(Continued)

(56) References Cited

U.S. PATENT DOCUMENTS 6,701,891 B2 * 3/2004 Niki ..................... F02D 11/107
123/396
6,980,902 B2 * 12/2005 Nakazawa .......... F02D 41/0002
123/508

(Continued)

FOREIGN PATENT DOCUMENTS

JP 2001-227362 A 8/2001
JP 2001-295670 A 10/2001
(Continued)

OTHER PUBLICATIONS

International Search Report for PCT/JP2017/004711 dated Apr. 18, 2017, 2 pages.
(Continued)

*Primary Examiner* — Freddie Kirkland, III
(74) *Attorney, Agent, or Firm* — Kilpatrick Townsend & Stockton LLP

(57) ABSTRACT

A throttle valve abnormality determination device includes a permission/rejection determination unit configured to determine whether or not to permit a sticking determination of a throttle valve. The determination unit is configured to prohibit the sticking determination if a first temperature, which is a temperature in a passage through which intake air flows, is less than or equal to a freezing temperature at which the throttle valve may be frozen when an engine is started and, after prohibiting the sticking determination, permit the sticking determination if an integrated value of a heat amount conversion value based on a second temperature, which is a temperature in the passage, and an intake air amount exceeds a threshold value when the second tem-
(Continued)

perature is greater than or equal to a de-freezing temperature at which a frozen portion of the throttle valve is de-frozen.

5 Claims, 3 Drawing Sheets

(51) Int. Cl.
*F02D 45/00* (2006.01)
*F02D 11/10* (2006.01)
(52) U.S. Cl.
CPC ............... *F02D 2009/022* (2013.01); *F02D 2009/0213* (2013.01); *F02D 2009/0281* (2013.01); *F02D 2009/0294* (2013.01); *F02D 2011/108* (2013.01); *F02D 2200/0414* (2013.01); *Y02T 10/146* (2013.01)
(58) Field of Classification Search
CPC ....... F02D 2009/0213; F02D 2009/022; F02D 2009/0294; F02D 2200/0414; F02B 29/04; Y02T 10/146
See application file for complete search history.

(56) References Cited

U.S. PATENT DOCUMENTS

| | | | |
|---|---|---|---|
| 7,434,565 B2* | 10/2008 | Miyachi | ................ F02D 41/107 |
| | | | 123/361 |
| 8,113,169 B2* | 2/2012 | Miyazaki | ................ F02D 9/104 |
| | | | 123/337 |
| 9,175,619 B2* | 11/2015 | Whitehead | .............. F02D 41/04 |
| 2006/0213483 A1 | 9/2006 | Miyachi | |
| 2009/0194078 A1 | 8/2009 | Miyazaki et al. | |

FOREIGN PATENT DOCUMENTS

| | | |
|---|---|---|
| JP | 2006-249952 A | 9/2006 |
| JP | 2015-178812 A | 10/2015 |
| WO | 2008/004421 A1 | 1/2008 |
| WO | 2017/138602 A1 | 8/2017 |

OTHER PUBLICATIONS

International Preliminary Report on Patentability for PCT/JP2017/004711 dated Aug. 14, 2018, all pages.

* cited by examiner

US 10,738,713 B2

THROTTLE VALVE ABNORMALITY DETERMINATION DEVICE

TECHNICAL FIELD

The present invention relates to a throttle valve abnormality determination device that determines whether or not a throttle valve, which is arranged in an intake passage through which air drawn by an engine flows, has an abnormality.

BACKGROUND ART

A throttle valve is arranged in an intake passage of an engine. When the ambient temperature falls to below the freezing point while the engine is stopped, the moisture in air condenses and freezes. As a result, the throttle valve becomes stuck in position where it was located when the engine stopped. Thus, patent document 1 discloses a technique that controls a throttle valve to open when the engine stops to ensure that intake air is obtained when the engine is started even if the throttle valve freezes.

PRIOR ART DOCUMENT

Patent Document

Patent Document 1: Japanese Laid-Open Patent Publication No. 2001-227362

SUMMARY OF THE INVENTION

Problems That are to be Solved by the Invention

The freezing of the throttle valve is not an abnormality that requires replacement of components because frozen portions are de-frozen when the driving of the engine increases the ambient temperature. However, the actual open degree does not follow the instructed open degree. Thus, an abnormality determination device may erroneously determine that an abnormality has occurred in the throttle valve.

It is an object of the present invention to provide a throttle valve abnormality determination device that reduces erroneous determinations resulting from the freezing of the throttle valve.

Means for Solving the Problem

A throttle valve abnormality determination device that solves the above problem includes a first temperature acquisition unit configured to acquire a first temperature that is a temperature in a passage through which intake air flows, a second temperature acquisition unit configured to acquire a second temperature that is a temperature in the passage, an air amount acquisition unit configured to acquire an intake air amount that is a mass flow rate of the intake air, and a permission/rejection determination unit configured to determine whether or not to permit a sticking determination of a throttle valve based on the first temperature, the second temperature, and the intake air amount. The permission/ rejection determination unit is configured to prohibit the sticking determination if the first temperature is less than or equal to a freezing temperature at which the throttle valve may be frozen when an engine is started and, after prohibiting the sticking determination, permit the sticking determination if an integrated value of a heat amount conversion value based on the second temperature and the intake air amount exceeds a threshold value when the second temperature is greater than or equal to a de-freezing temperature at which a frozen portion of the throttle valve is de-frozen.

EMBODIMENTS OF THE INVENTION

One embodiment of a throttle valve abnormality determination device will now be described with reference to FIGS. 1 to 4. The overview of an engine system including the throttle valve abnormality determination device will now be described with reference to FIG. 1.

Figure 1:
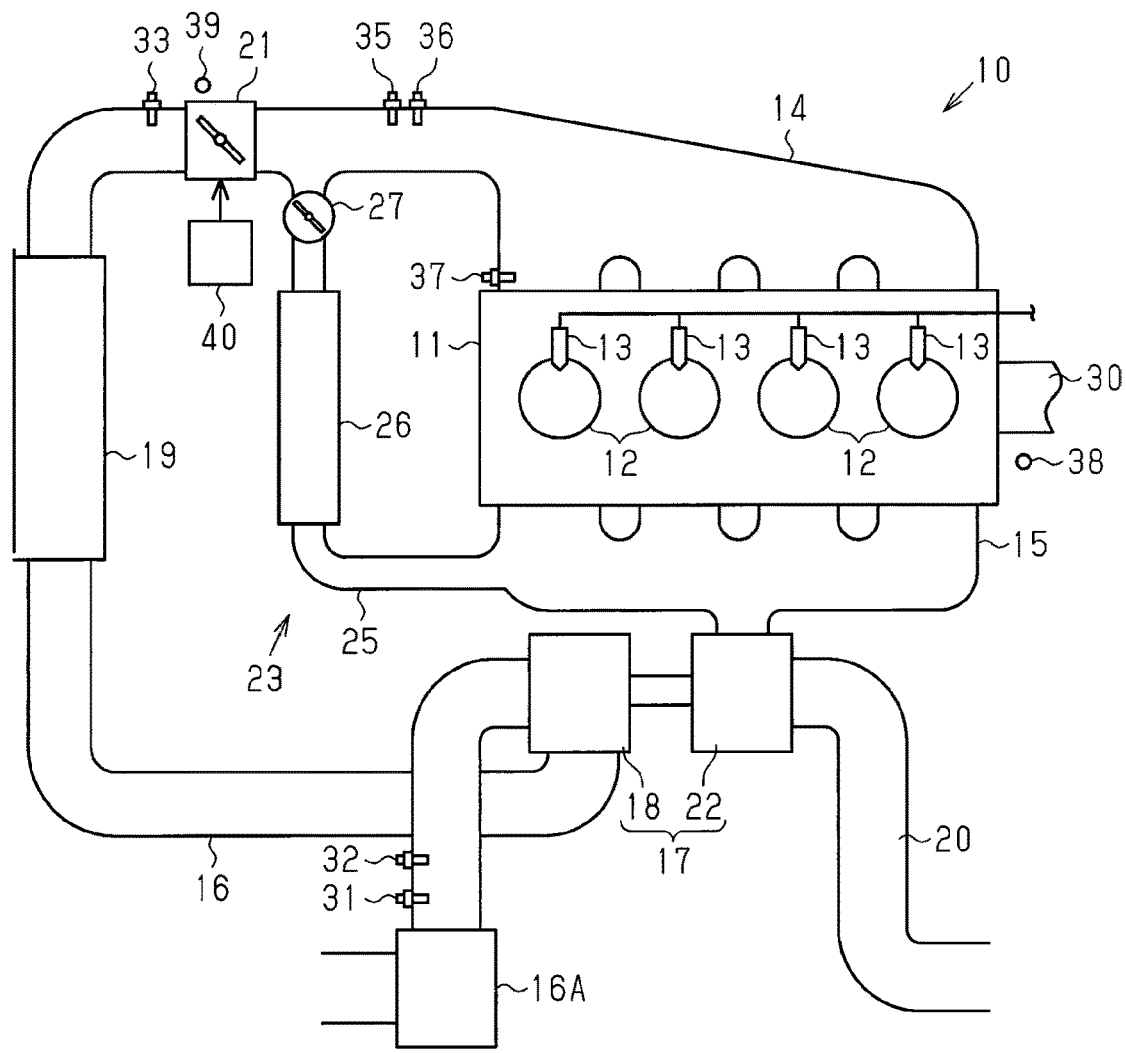
FIG. 1 is a schematic diagram showing the structure of an engine system including one embodiment of a throttle valve abnormality determination device.

As shown in FIG. 1, the engine system includes a water-cooled engine 10. A cylinder block 11 includes cylinders 12. An injector 13 injects fuel into each cylinder 12. An intake manifold 14 that supplies each cylinder 12 with working gas and an exhaust manifold 15 into which exhaust gas flows from each cylinder 12 are connected to the cylinder block 11.

An intake passage 16 connected to the intake manifold 14 includes, sequentially from an upstream side, an air cleaner 16A, a compressor 18, which is an element forming a turbocharger 17, an intercooler 19, and a throttle valve 21. The intercooler 19 is a cooling unit that cools intake air of which the temperature is increased when turbocharged by the turbocharger 17, which is a forced induction device. The throttle valve 21 is an electronically controlled throttle valve that changes the cross-sectional passage area of intake air in the intake passage 16 when receiving a signal indicating an instructed open degree from an open degree controller 40 that controls an open degree of the throttle valve 21. An exhaust passage 20 connected to the exhaust manifold 15 includes a turbine 22, which is an element forming the turbocharger 17.

The engine system includes an EGR device 23. The EGR device 23 includes an EGR passage 25 that connects the exhaust manifold 15 and the intake passage 16. The EGR passage 25 includes an EGR cooler 26 and an EGR valve 27, which is located closer to the intake passage 16 than the EGR cooler 26. When the EGR valve 27 is open, some of the exhaust gas is drawn into the intake passage 16 as EGR gas, and the cylinders 12 are supplied with working gas that is a mixture of exhaust gas and intake air. The passage through which intake air flows is formed by the intake passage 16 and the intake manifold 14.

The engine system includes various sensors. An intake air amount sensor 31 and an intake temperature sensor 32 are located between the air cleaner 16A and the compressor 18 in the intake passage 16. The intake air amount sensor 31 detects an intake air amount Ga, which is a mass flow rate of the intake air immediately after passing through the air cleaner 16A. The intake temperature sensor 32 detects an intake temperature Ta, which is the temperature of the intake air immediately after passing through the air cleaner 16A. An inflow temperature sensor 33 is located between the intercooler 19 and the throttle valve 21 to detect an inflow temperature Ttv, which is the temperature of the intake air that flows into the throttle valve 21. A first working gas temperature sensor 35 is located between the intake manifold 14 and a portion of the EGR passage 25 connected to the intake passage 16 to detect a first working gas temperature Tip, which is the temperature of the working gas flowing through the intake passage 16. A boost pressure sensor 36 is located between the intake manifold 14 and the portion of the EGR passage 25 connected to the intake passage 16 to detect a boost pressure Pb, which is the pressure of the working gas flowing through the intake passage 16. A second working gas temperature sensor 37 is coupled to the intake manifold 14 to detect a second working gas temperature Tim, which is the temperature of the working gas that flows into the cylinders 12. An engine speed sensor 38 detects an engine speed Ne, which is the speed of a crankshaft 30. An open degree sensor 39 arranged in the throttle valve 21 detects an open degree of the throttle valve 21.

The throttle valve abnormality determination device will now be described with reference to FIGS. 2 to 4.

Figure 2:
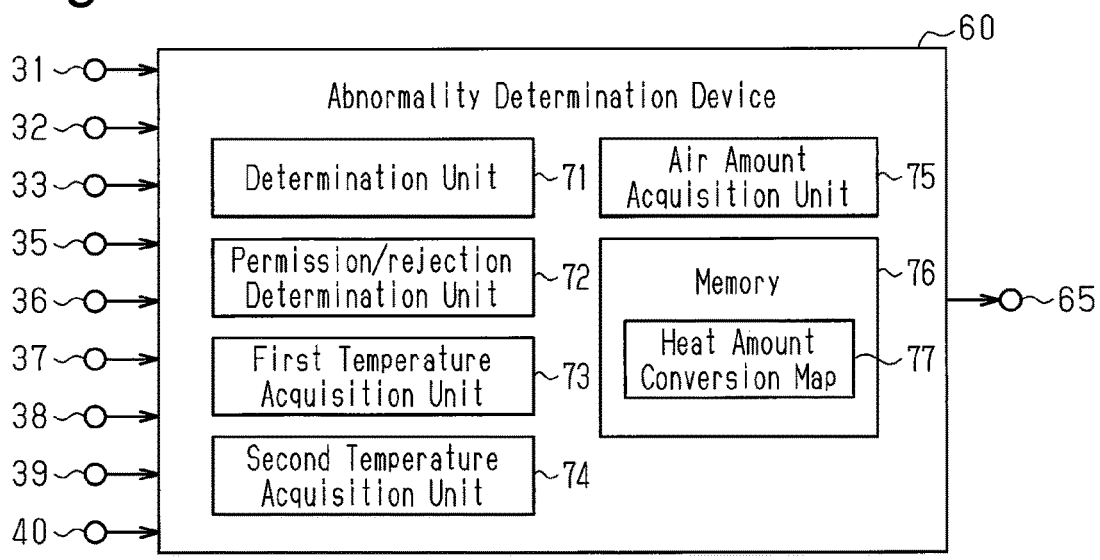
FIG. 2 is a functional block diagram showing the configuration of the abnormality determination device of FIG. 1.

As shown in FIG. 2, a throttle valve abnormality determination device 60 (hereinafter referred to as the abnormality determination device 60) is mainly configured by a microcomputer and can be achieved by, for example, circuitry, that is, one or more dedicated hardware circuits such as an ASIC, one or more processing circuits that operate in accordance with computer programs (software), or a combination thereof. The processing circuit includes a CPU and a memory 76 (for example, ROM and RAM) that stores a program or the like executed by the CPU. The memory 76, or computer readable medium, includes any usable medium that can be accessed by a versatile or dedicated computer. In addition to a signal from each sensor, the abnormality determination device 60 receives a signal indicating an instructed open degree of the throttle valve 21 from the open degree controller 40. When determining whether or not the throttle valve 21 has an abnormality and determining that an abnormality has occurred in the throttle valve 21, the abnormality determination device 60 turns on a malfunction indication lamp (MIL) 65 to notify a driver of the abnormality of the engine system. The open degree controller 40 controls the throttle valve 21 to open at a predetermined open degree when the engine 10 stops to ensure that intake air is obtained when the engine 10 starts even if the throttle valve 21 freezes.

The abnormality determination device 60 includes, as function units, a determination unit 71, a permission/rejection determination unit 72, a first temperature acquisition unit 73, a second temperature acquisition unit 74, an air amount acquisition unit 75, and the memory 76.

The determination unit 71 determines whether or not the throttle valve 21 has an abnormality. The determination unit 71 acquires, as a determination result, a sticking determination indicating that the throttle valve 21 is stuck when, for example, the open degree detected by the open degree sensor 39 does not follow the instructed open degree of the open degree controller 40.

The permission/rejection determination unit 72 determines whether or not to permit the sticking determination performed by the determination unit 71. Based on acquired values of the first temperature acquisition unit 73, the second temperature acquisition unit 74, and the air amount acquisition unit 75, the permission/rejection determination unit 72 performs a permission/rejection determination process that determines whether or not to permit the sticking determination performed by the determination unit 71. In the permission/rejection determination process, the first temperature acquisition unit 73 acquires an intake temperature Ta, which is the detection value of the intake temperature sensor 32, as a first temperature T1 from the various temperature sensors. Further, the second temperature acquisition unit 74 acquires an inflow temperature Ttv, which is the detection value of the inflow temperature sensor 33, as a second temperature T2 from the various temperature sensors. In addition, the air amount acquisition unit 75 acquires the intake air amount Ga, which is the detection value of the intake air amount sensor 31, and the memory 76 stores a heat amount conversion map 77 used for the permission/rejection determination process.

The permission/rejection determination process will now be described with reference to FIG. 3. The permission/rejection determination process starts when the engine 10 starts.

Figure 3:
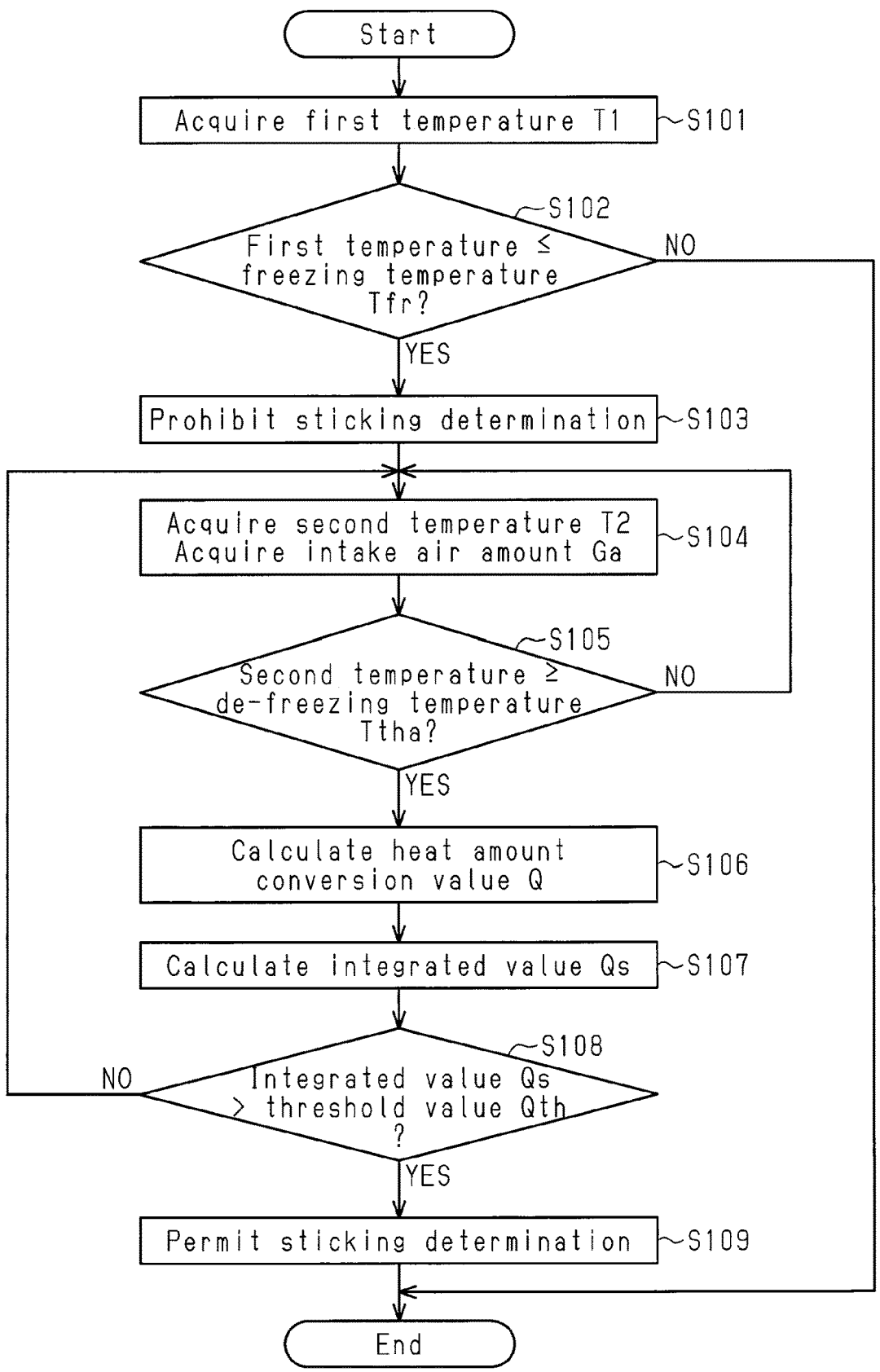
FIG. 3 is a flowchart showing an example of the procedures executed in a permission/rejection determination process performed by the abnormality determination device of FIG. 1.

As shown in FIG. 3, the permission/rejection determination unit 72 first acquires the intake temperature Ta, which is the detection value of the intake temperature sensor 32, as the first temperature T1 through the first temperature acquisition unit 73 (step S101). Then, the permission/rejection determination unit 72 determines whether or not the acquired first temperature T1 is less than or equal to a freezing temperature Tfr (for example, "0° C."), at which the throttle valve 21 may be frozen (step S102). When the first temperature T1 is higher than the freezing temperature Tfr (step S102: NO), the permission/rejection determination unit 72 determines that the throttle valve 21 is most likely not frozen and ends the permission/rejection determination process. When the first temperature T1 is less than or equal to the freezing temperature Tfr (step S102: YES), the permission/rejection determination unit 72 determines that the throttle valve 21 has frozen and prohibits the sticking determination (step S103).

Subsequently, the permission/rejection determination unit 72 acquires the inflow temperature Ttv, which is the detection value of the inflow temperature sensor 33, as the second temperature T2 through the second temperature acquisition unit 74 and acquires the intake air amount Ga, which is the detection value of the intake air amount sensor 31 (step S104). The permission/rejection determination unit 72 determines whether or not the acquired second temperature T2 is greater than or equal to a de-freezing temperature Ttha (for example, "5° C."), at which the frozen portion of the throttle valve 21 de-freezes (step S105). When the second temperature T2 is higher than the de-freezing temperature Ttha (step S105: YES), the permission/rejection determination unit 72 calculates a heat amount conversion value Q, which is the conversion value of the amount of heat that moves from the intake air to the throttle valve 21, based on the heat amount conversion map 77 held in the memory 76 (step S106). The heat amount conversion map 77 is data that sets the heat amount conversion value Q corresponding to the intake air amount Ga and the second temperature T2. The permission/rejection determination unit 72 calculates the heat amount conversion value Q by selecting a value that corresponds to the intake air amount Ga and the second temperature T2 from the heat amount conversion map 77.

Figure 4:
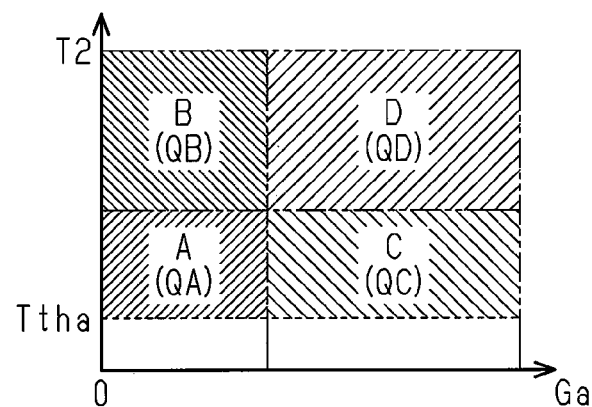
FIG. 4 is a schematic diagram showing an example of a heat amount conversion map used for a permission/rejection determination process of FIG. 3.

For example, as shown in FIG. 4, the heat amount conversion map 77 includes regions A, B, C, and D corresponding to the second temperature T2 and the intake air amount Ga for a range greater than or equal to the de-freezing temperature Ttha. Different heat amount conversion values Q are set for regions A to D. For example, a heat amount conversion value QA corresponding to region A is less than a heat amount conversion value QB corresponding to region B and a heat amount conversion value QC corresponding to region C. Further, a heat amount conversion value QD corresponding to region D is greater than the heat amount conversion value QB and the heat amount conversion value QC.

Returning to FIG. 3, the permission/rejection determination unit 72 calculates an integrated value Qs of the heat amount conversion values Q in the next step S107 and determines whether or not the integrated value Qs is greater than a threshold value Qth in the following step S108. The threshold value Qth is a value set based on the results of experiments that have been conducted in advance and is the integrated value Qs used to determine that the frozen portion of the throttle valve 21 has de-frozen.

When the integrated value Qs is less than or equal to the threshold value Qth (step S108: NO), the permission/rejection determination unit 72 determines that the frozen portion of the throttle valve 21 has not de-frozen and returns to step S104 to acquire the second temperature T2 (inflow temperature Ttv) and the intake air amount Ga again. When the acquired second temperature T2 is lower than the de-freezing temperature Ttha (step S105: NO), the permission/rejection determination unit 72 returns to step S104 again while maintaining the integrated value Qs. When the second temperature T2 is higher than the de-freezing temperature Ttha (step S105: YES), the permission/rejection determination unit 72 performs the processes of steps S106 to S108.

When the integrated value Qs becomes greater than the threshold value Qth (step S108: YES), the permission/rejection determination unit 72 determines that the frozen portion of the throttle valve 21 has de-frozen, permits the sticking determination for the throttle valve 21 (step S109), resets the integrated value Qs, and then ends the permission/rejection determination process.

The throttle valve abnormality determination device of the embodiment has the advantages described below.

(1) In the abnormality determination device 60, if the first temperature T1 (intake temperature Ta) is less than or equal to the freezing temperature Tfr when the engine 10 is started (step S102: YES), the permission/rejection determination 72 prohibits the sticking determination performed by the determination unit 71 (step S103). This reduces erroneous determinations resulting from the freezing of the throttle valve 21 immediately after the engine 10 starts. Further, the frozen portion of the throttle valve 21 is affected by the heat of the intake air passing through the throttle valve 21 more greatly than the radiant heat from other portions of the engine 10 or the like. Thus, if the integrated value Qs of the heat amount conversion values Q based on the second temperature T2 and the intake air amount Ga exceeds the threshold value Qth when the second temperature T2 is greater than or equal to the de-freezing temperature Ttha, the abnormality determination device 60 can determine the de-freezing of the frozen portion with high reliability. This reduces erroneous determinations resulting from the freezing of the throttle valve 21 even after permitting the sticking determination. That is, the abnormality determination device 60 reduces erroneous determinations of the sticking determination resulting from the freezing of the throttle valve 21.

(2) If the de-freezing of the frozen portion is determined based on, for example, the temperature of a coolant of the engine 10, a determination condition having a sufficient margin will be needed to determine the de-freezing of the frozen portion with high reliability. In this regard, the sticking determination by the determination unit 71 is quickly permitted by determining the de-freezing of the frozen portion based on the heat amount conversion value Q.

(3) The permission/rejection determination unit 72 calculates the heat amount conversion value Q by selecting a value that corresponds to the second temperature T2 and the intake air amount Ga from the heat amount conversion map 77 held in the memory 76. In such a configuration, as compared to when, for example, the heat amount conversion value Q is calculated using a calculation equation that includes the second temperature T2 and the intake air amount Ga as a parameter, the load on the permission/rejection determination unit 72 for calculating the heat amount conversion value Q is reduced.

(4) The second temperature acquisition unit 74 acquires the inflow temperature Ttv, which is the temperature of the intake air flowing through the throttle valve 21, as the second temperature T2. This configuration reduces errors in the actual temperature of the intake air flowing through the throttle valve 21 from the second temperature T2 used for the permission/rejection determination process. As a result, de-freezing of the frozen portion of the throttle valve 21 can be determined with higher reliability. That is, the reliability of a determination result of the freezing of the throttle valve 21 is increased.

(5) The first temperature acquisition unit 73 acquires, as the first temperature T1, the intake temperature Ta, which is the detection value of the intake temperature sensor 32. The intake temperature Ta differs from the intake temperature Ttv, the first working gas temperature Tip, and the second working gas temperature Tim in that the intake temperature Ta is always approximate to the ambient temperature even after the engine is driven. The detection of the freezing of the throttle valve 21 is further ensured by making the determination of whether or not the throttle valve 21 freezes at the intake temperature Ta.

(6) The air amount acquisition unit 75 acquires a detection value of the intake air amount sensor 31 as the intake air amount. Thus, as compared to when the intake air amount Ga is calculated using a calculation equation that includes the pressure of the intake manifold 14, the engine speed Ne, and the like as parameters, the load on the air amount acquisition unit 75 for acquiring the intake air amount Ga is reduced.

The above embodiment may be modified as described below.

The air amount acquisition unit 75 does not have to be configured to acquire a detection value of the intake air amount sensor 31 as the intake air amount Ga. Instead, the air amount acquisition unit 75 may be configured to acquire, as the intake air amount Ga, a value that is calculated with a calculation equation using a detection value of each sensor. For example, in the engine 10 including the EGR device, the air amount acquisition unit 75 may acquire, as the intake air amount Ga, a value obtained by subtracting the amount of EGR gas recirculated in the intake passage 16 from the amount of working gas drawn into the engine 10. In this configuration, the air amount acquisition unit 75 can calculate the amount of working gas from an equation of state based on the boost pressure Pb, the second working gas temperature Tim, the engine speed Ne, the displacement of the engine 10, and the like. Further, the air amount acquisition unit 75 can calculate the amount of EGR gas from a flow rate calculation equation of compressive fluid based on, the open degree of the EGR valve 27, the pressure difference of the EGR valve 27, the first working gas temperature Tip, and the like. Further, for example, in the engine 10 less the EGR device, the air amount acquisition unit 75 can calculate the intake air amount Ga from an equation of state based on the boost pressure Pb, the second working gas temperature Tim, the engine speed Ne, and the like.

When determining the de-freezing of the frozen portion of the throttle valve 21, the second temperature acquisition unit only needs to be configured to acquire, as the second temperature, the temperature in a passage formed by the intake passage 16 and the intake manifold 14.

The temperature of intake air flowing into the throttle valve 21 can be back-calculated from the first working gas temperature Tip based on the information of an operating state of the engine 10 such as the intake temperature Ta, the intake air amount Ga, the EGR gas amount, and the fuel injection amount. Thus, in step S104, the second temperature acquisition unit may acquire, as the second temperature, the first working gas temperature Tip, which is the detection value of the first working gas temperature sensor 35. In this case, a value of the first working gas temperature Tip used to determine that the intake air flowing into the throttle valve 21 de-freezes the frozen portion is set to the de-freezing temperature Ttha. This value is set based on the results of experiments and simulations that have been conducted in advance. In the same manner, the second temperature acquisition unit 74 may acquire, as the second temperature, the second working gas temperature Tim, which is the detection value of the second working gas temperature sensor 37.

Further, in step S104, the second temperature acquisition unit 74 may be configured to acquire, as the second temperature, the highest temperature of intake air flowing into the throttle valve 21 with a calculation based on each of the inflow temperature Ttv, the first working gas temperature Tip, and the second working gas temperature Tim.

Additionally, in step S104, the second temperature acquisition unit 74 may be configured to acquire each of the inflow temperature Ttv, the first working gas temperature Tip, and the second working gas temperature Tim as the second temperature. In this case, the permission/rejection determination unit 72 compares various temperatures to different de-freezing temperatures Ttha set to the temperatures and calculates the heat amount conversion value Q under the condition in which at least one of the second temperatures is greater than or equal to the de-freezing temperature Ttha. Further, the permission/rejection determination unit 72 calculates the heat amount conversion value Q using the second temperature that is greater than or equal to the de-freezing temperature Ttha, and the memory 76 stores the heat amount conversion map of each temperature.

In addition, the second temperature acquisition unit 74 may calculate different temperatures of the intake air flowing into the throttle valve 21 based on the inflow temperature Ttv, the first working gas temperature Tip, and the second working gas temperature Tim and acquire the average value of the calculation result as the second temperature. In such a configuration, the de-freezing of the frozen portion of the throttle valve 21 can be determined with high reliability.

When determining the possibility of the freezing of the throttle valve 21, the first temperature acquisition unit 73 only needs to be configured to acquire, as the first temperature, the temperature in a passage formed by the intake passage 16 and the intake manifold 14. Thus, in step S101, the first temperature acquisition unit 73 may be configured to acquire, as the first temperature, each of the intake temperature Ta, the inflow temperature Ttv, the first working gas temperature Tip, and the second working gas temperature Tim. In this case, the permission/rejection determination unit 72 compares various temperatures to different freezing temperatures Tfr set to the various temperatures and prohibits the sticking determination when at least one of the first temperatures is less than or equal to the freezing temperature Tfr.

Further, the first temperature acquisition unit 73 may acquire, as the first temperature, the average temperature of the intake temperature Ta, the inflow temperature Ttv, the first working gas temperature Tip, and the second working gas temperature Tim.

The temperature obtained by the first temperature acquisition unit 73 as the first temperature and the temperature obtained by the second temperature acquisition unit 74 as the second temperature may be the same temperature, for example, the inflow temperature Ttv.

The first temperature acquisition unit 73 and the second temperature acquisition unit 74 may acquire, as the temperature of the intake passage 16, the temperature of intake air flowing into the intercooler 19 and the temperature of the intake air immediately after passing through the throttle valve 21 and use the temperatures to calculate the first temperature T1 and the second temperature T2.

In the permission/rejection determination process, when the second temperature T2 is lower than the de-freezing temperature Ttha (step S105: NO), at the time of returning to step S104, the permission/rejection determination unit 72 may perform a process that subtracts the integrated value Qs from a value based on, for example, the intake air amount Ga and the second temperature T2. This configuration can increase or decrease the integrated value Qs in accordance with the changes in the intake air amount Ga and the second temperature T2. In this case, the heat amount conversion value Q for subtraction is set in a region of the heat amount conversion map 77 where the second temperature T2 is less than or equal to the de-freezing temperature Ttha.

Figure 5:
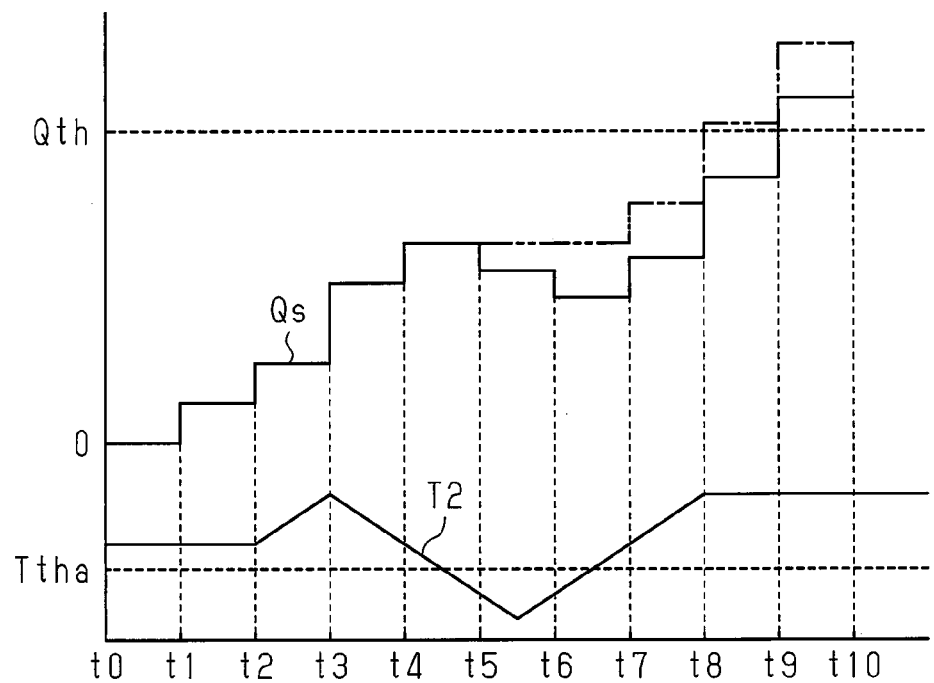
FIG. 5 is a timing chart showing an example of the relationship of an inflow temperature and an integrated value of a heat amount conversion value in a modified example.

For example, as shown in FIG. 5, when the engine 10 is started and the sticking determination is prohibited at time t0, the integrated value Qs increases in correspondence with the second temperature T2 and the intake air amount Ga at times t1, t2, t3, and t4. When the second temperature T2 is lower than the de-freezing temperature Ttha like at time t5 and t6, the integrated value Qs is subtracted in correspondence with the second temperature T2 and the intake air amount Ga at times t5 and t6 without being maintained at the value at time t4 as shown in the double-dashed line. In the period following the next time t7, the second temperature T2 is higher than the de-freezing temperature Ttha. Thus, the integrated value Qs increases in correspondence with the second temperature T2 and the intake air amount Ga. Such a configuration further increases the accuracy of a de-freezing period of the throttle valve 21.

The heat amount conversion map 77 does not have to be configured to set a heat amount conversion value Q for each of the regions as described above. Instead, the heat amount conversion map 77 may be configured to set different heat amount conversion values Q in correspondence with the second temperature T2 and the intake air amount Ga. Further, the heat amount conversion map 77 may be a value that becomes higher as the intake air amount Ga increases regardless of the second temperature T2. That is, the heat amount conversion value Q may be a value that depends only on the intake air amount Ga under the condition in which the second temperature T2 is greater than or equal to the de-freezing temperature Ttha.

The abnormality determination device 60 may be incorporated in a controller including the controller 40 that controls the open degree of the throttle valve 21. For example, the abnormality determination device 60 may be incorporated in a controller that centrally controls the throttle valve 21 or a controller that centrally controls the engine 10 including the control of the throttle valve 21.

The forced induction device only needs to be configured to turbocharge intake air. The forced induction device is not limited to a turbo-type forced induction device using exhaust gas such as the turbocharger 17 and may be, for example, a mechanical forced induction device using the rotation produced by the crankshaft 30.

The engine 10 only needs to be an engine including the throttle valve 21 and may be a diesel engine or a gasoline engine. Alternatively, the engine 10 may be a natural gas engine. As another option, the engine 10 may be an engine less the EGR device 23 or an engine less the forced induction device.

What is claimed is:

1. A throttle valve abnormality determination device comprising:
   a first temperature acquisition unit configured to acquire a first temperature that is a temperature in a passage through which intake air flows;
   a second temperature acquisition unit configured to acquire a second temperature that is a temperature in the passage;
   an air amount acquisition unit configured to acquire an intake air amount that is a mass flow rate of the intake air; and
   a permission/rejection determination unit configured to determine whether or not to permit a sticking determination of a throttle valve based on the first temperature, the second temperature, and the intake air amount, wherein
   the permission/rejection determination unit is configured to:
   prohibit the sticking determination if the first temperature is less than or equal to a freezing temperature at which the throttle valve may be frozen when an engine is started; and
   after prohibiting the sticking determination, permit the sticking determination if an integrated value of a heat amount conversion value based on the second temperature and the intake air amount exceeds a threshold value when the second temperature is greater than or equal to a de-freezing temperature at which a frozen portion of the throttle valve is de-frozen.

2. The throttle valve abnormality determination device according to claim 1, wherein the permission/rejection determination unit is configured to hold a heat amount conversion map that sets the heat amount conversion value corresponding to the second temperature and the intake air amount and calculate the heat amount conversion value by selecting a value corresponding to the second temperature and the intake air amount from the heat amount conversion map.

3. The throttle valve abnormality determination device according to claim 1, wherein
   the engine includes a forced induction device that turbocharges the intake air and a cooler that cools the intake air turbocharged by the forced induction device, wherein the forced induction device and the cooler are located at an upstream side of the throttle valve, and
   the second temperature acquisition unit is configured to acquire a temperature of a location between the cooler and the throttle valve as the second temperature.

4. The throttle valve abnormality determination device according to claim 3, wherein the first temperature acquisition unit is configured to acquire, as the first temperature, a temperature of an upstream side of a compressor that forms the forced induction device.

5. The throttle valve abnormality determination device according to claim 1, wherein the air amount acquisition unit is configured to acquire a detection value of an intake air amount sensor as the intake air amount.

* * * * *